United States Patent
Sayyed et al.

(10) Patent No.: US 12,405,848 B2
(45) Date of Patent: Sep. 2, 2025

(54) ERROR CORRECTION DYNAMIC METHOD TO DETECT AND TROUBLESHOOT SYSTEM BOOT FAILURES

(71) Applicant: DELL PRODUCTS L.P., Round Rock, TX (US)

(72) Inventors: Ibrahim Sayyed, Georgetown, TX (US); Chris Edward Pepper, Leander, TX (US); Christopher Channing Griffin, Cedar Park, TX (US); Elmira M. Bonab, Austin, TX (US); Purushothama R. Malluru, Round Rock, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 100 days.

(21) Appl. No.: 17/960,408

(22) Filed: Oct. 5, 2022

(65) Prior Publication Data
US 2024/0118966 A1    Apr. 11, 2024

(51) Int. Cl.
*G06F 11/30* (2006.01)
*G06F 11/07* (2006.01)

(52) U.S. Cl.
CPC ...... *G06F 11/0793* (2013.01); *G06F 11/0757* (2013.01); *G06F 11/3024* (2013.01)

(58) Field of Classification Search
CPC ............. G06F 11/0757; G06F 11/0793; G06F 11/3024
See application file for complete search history.

(56) References Cited

U.S. PATENT DOCUMENTS

| | | | |
|---|---|---|---|
| 6,205,547 B1 * | 3/2001 | Davis | G06F 1/24 713/1 |
| 6,393,586 B1 * | 5/2002 | Sloan | G06F 11/2284 713/1 |
| 7,706,611 B2 | 4/2010 | King et al. | |
| 7,734,945 B1 * | 6/2010 | Levidow | G06F 11/0793 714/3 |
| 8,194,646 B2 | 6/2012 | Elliott et al. | |
| 8,271,415 B2 | 9/2012 | Iliff | |

(Continued)

FOREIGN PATENT DOCUMENTS

JP    6062864 B2    1/2017

OTHER PUBLICATIONS

"Do normal x86 or AMD PCs run startup/BIOS code directly . . . " by StackOverflow https://stackoverflow.com/questions/5300527/do-normal-x86-or-amd-pcs-run-startup-bios-code-directly-from-rom-or-do-they-cop/5347759#5347759 Published Mar. 2011 (Year: 2011).*

(Continued)

*Primary Examiner* — Joseph O Schell
(74) *Attorney, Agent, or Firm* — Jackson Walker LLP; Christopher J. Rourk

(57) ABSTRACT

A data processing system comprising a processor having a working memory and processing logic, a boot system configured to load one or more algorithms for initializing a basic input output system (BIOS) of the processor into the working memory and an error correction system configured to start a watchdog timer and to monitor initialization of the processor, the error correction system further configured to implement a corrective process if the watchdog timer times out prior to initialization of the BIOS of the processor.

20 Claims, 2 Drawing Sheets

(56) References Cited

U.S. PATENT DOCUMENTS

| | | | |
|---|---|---|---|
| 8,520,695 B1 | 8/2013 | Rubin et al. | |
| 8,543,665 B2 | 9/2013 | Ansari et al. | |
| 9,207,948 B2* | 12/2015 | Jiang | G06F 11/1417 |
| 2002/0184482 A1* | 12/2002 | Lacombe | G06F 11/0757 713/1 |
| 2008/0229158 A1* | 9/2008 | Saito | G06F 11/0757 714/E11.004 |
| 2012/0290884 A1* | 11/2012 | Hamaguchi | G06F 1/00 714/49 |
| 2016/0179606 A1* | 6/2016 | Perry | G06F 11/0715 714/38.11 |
| 2018/0095806 A1* | 4/2018 | Aneja | G06F 11/00 |
| 2019/0082339 A1 | 3/2019 | Dion et al. | |
| 2019/0114549 A1 | 4/2019 | Olsher | |
| 2019/0342859 A1 | 11/2019 | Rubin et al. | |
| 2020/0012552 A1* | 1/2020 | Brown | G06F 9/4406 |
| 2020/0226260 A1* | 7/2020 | Aggarwal | G06F 21/566 |
| 2020/0294401 A1 | 9/2020 | Kerecsen | |
| 2020/0363855 A1* | 11/2020 | Basterash | G06F 1/3203 |
| 2022/0269565 A1* | 8/2022 | Chou | G06F 11/1417 |
| 2023/0229538 A1* | 7/2023 | Warkentin | G06F 11/1417 714/55 |
| 2024/0220367 A1* | 7/2024 | Hiremath | G06F 11/14 |

OTHER PUBLICATIONS

"How BIOS Works" by Yale.edu Historical version archived by the WayBack Machine https://web.archive.org/web/20141003015022/ https://flint.cs.yale.edu/feng/cos/resources/BIOS/ Oct. 3, 2014 (Year: 2014).*

Wikipedia's UEFI historical version published Oct. 9, 2022 https://en.wikipedia.org/w/index.php?title=UEFI&oldid=1115112729 (Year: 2022).*

* cited by examiner

ERROR CORRECTION DYNAMIC METHOD TO DETECT AND TROUBLESHOOT SYSTEM BOOT FAILURES

TECHNICAL FIELD

The present disclosure relates generally to data processors, and more specifically to an error correction dynamic method to detect and troubleshoot system boot failures.

BACKGROUND OF THE INVENTION

Starting a processor is often referred to as booting, and is a necessary stage in configuring the processor for operation. Errors that occur during booting can be difficult to recover from.

SUMMARY OF THE INVENTION

A data processing system is disclosed that includes a processor having a working memory and processing logic. A boot system is configured to load one or more algorithms for initializing a basic input output system (BIOS) of the processor into the working memory, and an error correction system is configured to start a watchdog timer and to monitor initialization of the processor. The error correction system is further configured to implement a corrective process if the watchdog timer times out prior to initialization of the BIOS of the processor.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
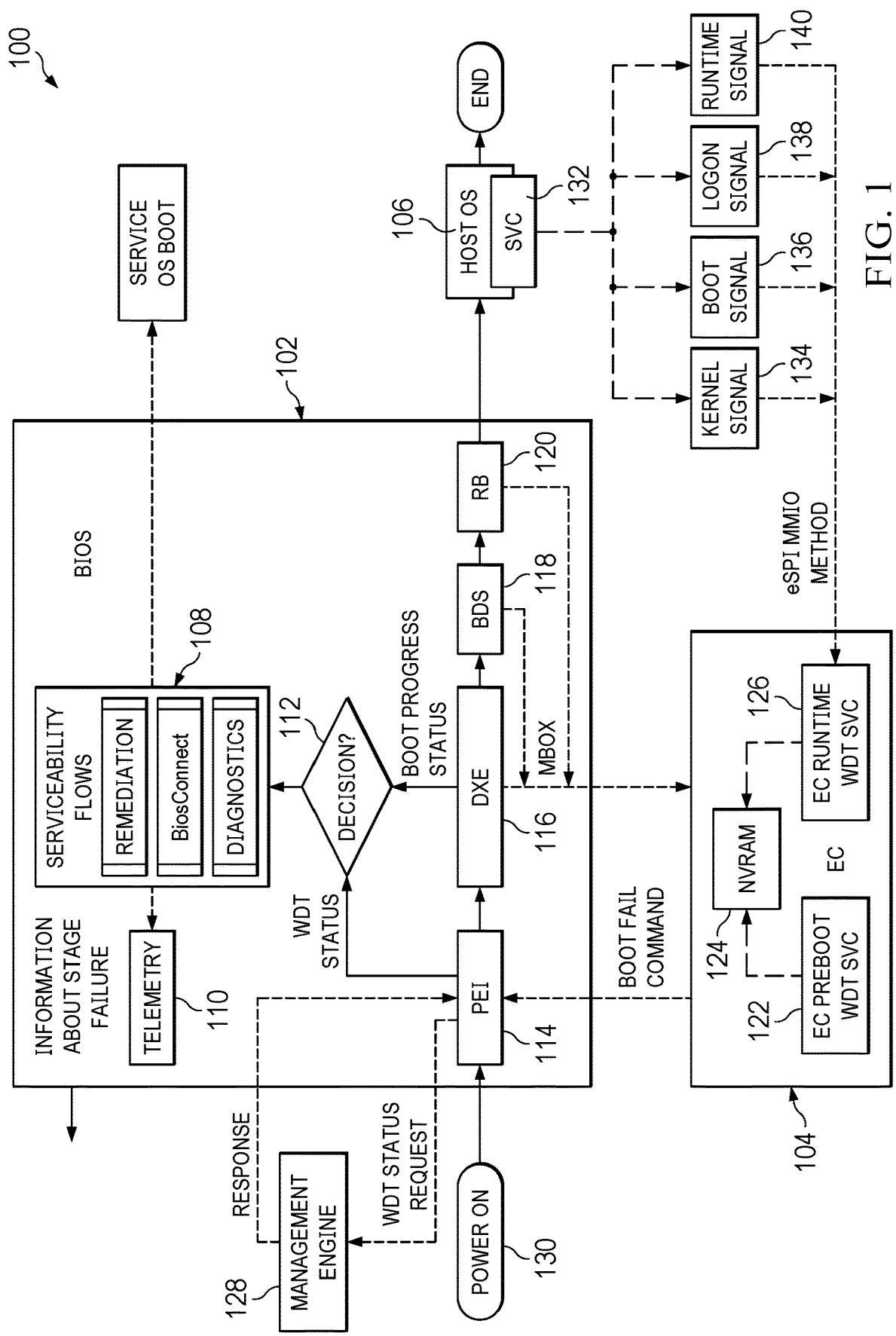
FIG. 1 is a diagram of a system for using error correction to track boot progress from pre-initialization to reboot (PEI-RB) inside of BIOS and OS bootloader to log-on time, in accordance with three example embodiments of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

Data processing systems are sold with a combination of hardware, software and firmware, each of which can be provided by different suppliers. Incompatibility between these components can be indistinguishable from corrupted boot files that are installed when the processor is initialized. If a data processing system experiences boot issues, it can stop functional operations or "freeze," which can make it difficult to troubleshooting these issues. A solution to such problems (which can result in an operational system) might not fully address faulty hardware, outdated firmware or missing OS boot startup core critical files. In addition, no standard methods exist for Unified Extensible Firmware Interface (UEFI) compliant systems to debug which phases of the computer gets struck.

Some original equipment manufacturers (OEMs) provide a Simple Boot Flag (SBF) mechanism where the operating system (OS) boot loader asserts the SBF and plug and play (PnP) flags inside the non-volatile random access memory (NVRAM) to indicate that the OS boot was successful. Upon next boot, the basic input/output system (BIOS) can obtain the state of the NVRAM SBF flag and determine the health status of the previous OS boot. This function does not address the boot process once the bootloader has handed off control to the OS kernel and then follows OS logon, which is where incompatibility conditions with data processing system components can cause the data processing system to stop functioning.

The present disclosure recognizes that it is important to have an intelligent advanced method to provide coverage for the entire boot process, including the transition from the boot process to OS control. The present disclosure provides systems and methods to provide a diagnosis for these boot issues that can occur after completion of boot load and prior to operation of the OS. At present, there is no unified system or method for accomplishing this, because different vendors are associated with the production of computer hardware, the BIOS, firmware and OS software.

The present disclosure provides standard systems and methods for managing a boot process from the point where power to the data processing system is turned on until there has been a successful OS log-on. In one example embodiment, a runtime service is provided to track the boot progress in all the phases of the computer boot and to ensure that any operational issues are properly identified and remediated, with the correct set of serviceability flows. In another example embodiment, BIOS firmware Advanced Configuration and Power Interface (ACPI) issues cannot be fixed by running the OS diagnostics, and OS registry corruption and missing core driver critical files cannot be remediated by pre-boot diagnostics. The present disclosure provides systems and methods for accomplishing these objectives.

The present disclosure provides a number of example embodiments. In one example embodiment, a system and method are provided for an error correction (EC) pre-boot watchdog timer (WDT) service that tracks the boot progress of the BIOS phases and records the telemetry of every boot stage. In another example embodiment, systems and methods are provided for an EC runtime WDT service that tracks the boot progress from OS bootloader to OS Logon. In another example embodiment, systems and methods for BIOS/EC to management engine (ME) coordination are provided to detect boot time failures detected by vendor custom services. This embodiment can be employed when the first two embodiments are not available.

The present disclosure provides a number of important technical advantages. One important technical advantage is real-time monitoring of pre-OS and OS boot progress using an EC WDT runtime service. Another important technical advantage is an EC method of instrumenting the BIOS reboot flows based on boot failure. Yet another technical advantage is applying a selected remediation of serviceability flows based on a stage of the boot failure, such as auto-heal, capabilities-based mitigation, cold reboot/DIMM mitigations and other suitable measures as discussed and described herein. Numerous other technical advantages will be apparent to a person of skill in the art upon review of the teachings of the present disclosure.

FIG. 1 is a diagram of a system 100 for using error correction to track boot progress from pre-initialization to reboot (PEI-RB) inside of BIOS and OS bootloader to log-on time, in accordance with three example embodiments of the present disclosure. System 100 includes BIOS 102, EC 104 and host OS 106, each of which can be implemented as hardware or a suitable combination of hardware and software.

For a first embodiment, boot time tracking from pre-initialization to reboot is tracked in every successful phase of BIOS 102 load and initialization. EC 104 starts a watchdog timer and resets it upon receiving a success signal at the end of each BIOS phase through an \MBOX command. In the event of a fail, an EC watch dog timer timeout occurs if any one of the BIOS phases fails to send a success signal. In this situation, EC 104 records the telemetry at that phase, such as (PEI: success, driver execution environment (DXE): success, boot device selection (BDS):TimeOut-Fail, RB:Empty) or other suitable telemetry.

For EC 104 actions, if a problem happens that results in no boot, no video or other errors, then EC 104 can reset the power rail, the power circuitry or other suitable systems or components, such as the real-time clock (RTC). If a problem is inside of the boot device selection phase, then EC 104 can instrument the BIOS recovery to perform a diagnosis and a remote flash update. BIOS actions can include boot time tracking from boot loader to OS log-on, providing an out of bound mechanism for certain original equipment manufacturers (OEMs) such as Intel and AMD, or other suitable functions.

In one example embodiment, the following algorithm can also or alternatively be used:
Step-1: EC starts the WDT timer
Step-2: End of BIOS phase signal to EC through MBOX command
Step3: EC upon receiving the MBOX command resets the WDT timer.
Step4: in fail case, EC didn't receive the signal from BIOS, WDT timeout happened.→EC logs the telemetry, e.g. (PEI:Success. DXE:Success. BDS:TimeOut-Fail. RB:Empty)

EC 104 starts a watchdog timer, such as EC Preboot WDT service 122 or EC runtime WDT service 126, each of which interface with NVRAM 124. EC 104 resets the watchdog timer upon receiving a success signal from the end of BIOS phases BDS 118 and RB 120 through an MBOX command. In the event of a fail, EC 104 watchdog timer times out if any of the BIOS phases fail to send a success signal. EC 104 records the telemetry at that phase in NVRAM 124, such as (PEI:Success. DXE:Success. BDS:TimeOut-Fail. RB:Empty.) or other suitable telemetry.

Serviceability flows 108 are configured to provide remediation, BIOS connections and diagnostics, with tracking data stored in telemetry log 110 and OS boot service. A decision block 112 receives a boot progress status and a WDT status and provides an indication to serviceability flows 108 is any of DXE 116, BDS 118 or RB 120 fails to send a success indicator in the boot progress status.

The management engine 128 receives a watchdog timer status request from PEI 114 and returns a response. PEI 114 provides a watchdog timer status to decision circuit 112.

In a second example embodiment, EC 104 tracks boot progress from boot load to a successful OS logon. The host OS 106 side of service 132 presents signals to EC 104 at every phase through an enhanced serial peripheral interface memory-mapped input-output interface (eSPI MMIO) command. The host OS 106 includes a service 132 that interfaces with kernel signal 134, boot signal 136, logon signal 138 and runtime signal 140. In every successful phase of OS runtime, EC 104 starts the watchdog timer and resets it upon receiving the success signal from the end of every OS phase. In the event of a fail, EC watchdog timer time out occurs if any one of the OS phases fails to send a success signal. If a problem occurs that results in boot time blue screen, EC 104 instruments the BIOS to fast boot to the service OS. The following example algorithm can be implemented:
Step-1: EC starts the WDT timer
Step-2: End of BIOS phase signal to EC through MBOX command
Step3: EC resets the WDT timer upon receiving the MBOX command.
Step4: In fail case, EC didn't receive the signal from BIOS, WDT timeout happened.→EC logs the telemetry, e.g. (Kernel;Success. OS logon:Fail. Runtime: Empty)

In a third example embodiment, out of bound mechanisms on clean OS are provided. Some management engines 128 such as Intel and AMD have firmware and OS presence that is configured to detect unbootable encounters. The system firmware and management engine firmware coordinate to get the status of the boot time crashes. This method can be used when the OS image is wiped without an OEM software presence, or in other suitable embodiments.

Figure 2:
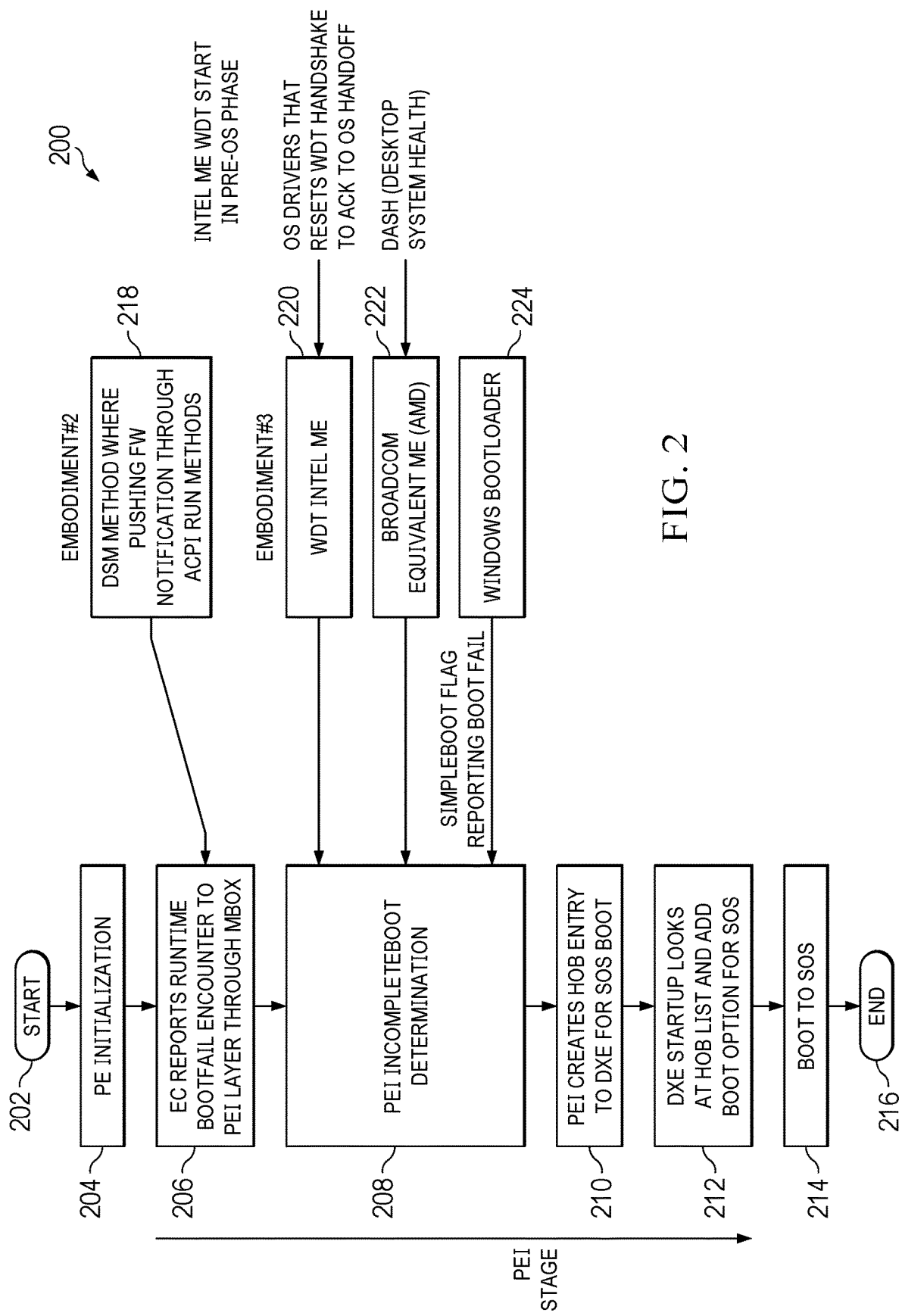
FIG. 2 is a diagram of an algorithm for using EC to track boot progress from pre-initialization to reboot (PEI-RB) inside of BIOS and OS bootloader to log-on time, in accordance with an example embodiment of the present disclosure.

FIG. 2 is a diagram of an algorithm 200 for using EC to track boot progress from pre-initialization to reboot (PEI-RB) inside of BIOS and OS bootloader to log-on time, in accordance with an example embodiment of the present disclosure. Algorithm 200 can be implemented in hardware or a suitable combination of hardware and software.

Algorithm 200 begins at 202, and proceeds to 204 where pre-initialization reboot is performed. The algorithm then proceeds to 206.

At 206, the error correction system reports a runtime boot fail encounter to the pre-initialization layer, such as through an MBOX message or in other suitable manners. The algorithm then proceeds to 208.

At 208, it is determined that there has been an incomplete pre-initialization boot. The algorithm then proceeds to 210.

At 210, the pre-initialization creates a hand-off block (HOB) entry to DXE for a service OS boot. The algorithm then proceeds to 212.

At 212, the DXE startup process looks at the HOB list and adds a boot option for the service OS. The algorithm then proceeds to 214.

In a second embodiment at 218, a storage manager pushes a firmware (FW) notification through an advanced configuration and power interface (ACPI) run, and the algorithm proceeds to 206.

In a third embodiment at 220, the management engine watchdog timer goes to 208 when OS drivers that resets WDT handshake to ACK to OS handoff.

At 222, the management engine goes to 208 as a function of the desktop engine health indication.

At 224, a bootloader goes to 208 with simple boot flag reporting boot fail.

Algorithm 200 provides an early BIOS PEI phase booting to a service OS-based on EC reporting of unbootable encounters. EC retrieves the telemetry from persistence space to see if any watchdog timeout happened, and the phase of the boot if failure occurred. Based on preboot versus OS boot phase, EC sends an MBOX command to the BIOS PEI regarding a previous boot fail with information about the boot phase. The BIOS PEI service handler can decode the MBOX command and instrument the rest of boot flows into serviceability mode. For example, the EC can send a command if the system encounters a boot interruption at the OS Kernel driver. The PEI handler can put the BIOS to boot to service OS and pass this information about the failure. The service OS can run the flows to remediate driver failures.

The present disclosure thus provides real time monitoring of pre-OS and OS boot progress using an EC WDT runtime service. An EC method of instrumenting the BIOS reboot flows based on boot failure is also provided. Based on the stage of the boot failure, a selected remediation of serviceability flows can be applied, such as auto-heal capabilities-based mitigation, cold reboot/DIMM mitigations and other suitable functions.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A data processing system comprising:
a processor having a working non-transient data memory and processing logic;
a boot system configured to load one or more algorithms for initializing a basic input output system (BIOS) of the processor into the working non-transient data memory; and
an error correction system configured to start a first watchdog timer for a pre-boot stage and to monitor initialization of the processor and to store data associated with the first watchdog timer in a non-volatile random access memory, the error correction system further configured to implement a corrective process if the first watchdog timer times out prior to receipt of a predetermined signal and to start a second watchdog timer upon receiving a success signal at an end of each of a plurality of BIOS phases after completion of the pre-boot phase and to store data associated with the second watchdog timer in the non-volatile random access memory.

2. The data processing system of claim 1 wherein the predetermined signal is generated upon completion of one of the BIOS phases during initialization of the BIOS of the processor and the error correction system stores PEI:Success telemetry data.

3. The data processing system of claim 1 wherein the predetermined signal is generated during runtime of the processor and the error correction system stores DXE:Success telemetry data.

4. The data processing system of claim 1 wherein the boot system is configured to load one or more algorithms for initializing an operating system of the processor into the working non-transient data memory and the error correction system is configured to implement a corrective process if the first watchdog timer times out prior to initialization of the operating system of the processor and prior to starting the second watchdog timer.

5. The data processing system of claim 1 further comprising a management engine configured to receive a watchdog timer status request and to generate a boot status indication as a function of a response to the watchdog timer status request.

6. The data processing system of claim 1 further comprising the error correction system configured to receive a watchdog timer status request and to generate a runtime status indication as a function of a response to the watchdog timer status request and the error correction system stores BDS:TimeOut-Fail telemetry data.

7. The data processing system of claim 1 wherein the first watchdog timer is coupled to a non-transient data memory device and the error correction system stores RB:Empty telemetry data.

8. The data processing system of claim 1 wherein the first watchdog timer and the second watchdog timer are coupled to a non-transient data memory device and are configured to store data in the non-transient data memory device.

9. The data processing system of claim 1 wherein the first watchdog timer is coupled to a non-transient data memory device and is configured to store system telemetry data in the non-transient data memory device.

10. The data processing system of claim 1 wherein the first watchdog timer is coupled to a non-transient data memory device and is configured to store system configuration stage status data in the non-transient data memory device.

11. A method for data processing comprising:
loading one or more algorithms for initializing a basic input output system (BIOS) of a processor having a working non-transient data memory and processing logic into the working non-transient data memory using a boot system;
starting a first watchdog timer using an error correction system before a pre-boot stage;
monitoring initialization of the processor using the error correction system;
implementing a corrective process with the error correction system if the first watchdog timer times out during a BIOS phase prior to receipt of a predetermined signal;
storing data in a random access memory device after the first watchdog timer times out;
starting a second watchdog timer after the pre-boot phase, and
storing data in the random access memory device after the second watchdog timer times out.

12. The method of claim 11 further comprising generating the predetermined signal upon completion of one of a plurality of BIOS phases during initialization of the BIOS of the processor.

13. The method of claim 11 further comprising generating the predetermined signal during runtime of the processor.

14. The method of claim 11 further comprising loading one or more algorithms for initializing an operating system of the processor into the working non-transient data memory and implementing a corrective process if the first watchdog timer times out prior to completion of one of a plurality of BIOS phases during initialization of the operating system of the processor.

15. The method of claim 11 further comprising receiving a watchdog timer status request during one of the BIOS phases and generating a boot status indication as a function of a response to the watchdog timer status request.

16. The method of claim 11 further comprising receiving a watchdog timer status request and generating a runtime status indication as a function of a response to the watchdog timer status request.

17. The method of claim 11 wherein the first watchdog timer is coupled to a non-transient data memory device.

18. The method of claim 11 further comprising storing data in a non-transient data memory device.

19. The method of claim 11 further comprising storing system telemetry data in a non-transient data memory device.

20. The method of claim 11 further comprising storing system configuration stage status data in a non-transient data memory device.

* * * * *